United States Patent
Yaguchi et al.

(10) Patent No.: US 7,259,511 B2
(45) Date of Patent: Aug. 21, 2007

(54) FLAT PANEL DISPLAY DEVICE WITH SURFACES OF CATHODES AND CONTROL ELECTRODES LYING IN THE SAME FLAT PLANE

(75) Inventors: Tomio Yaguchi, Sagamihara (JP); Takahiko Muneyoshi, Musashimurayama (JP); Makoto Okai, Tokorozawa (JP); Nobuaki Hayashi, Kunitachi (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 62 days.

(21) Appl. No.: 10/786,014

(22) Filed: Feb. 26, 2004

(65) Prior Publication Data

US 2004/0164666 A1  Aug. 26, 2004

(30) Foreign Application Priority Data

Feb. 26, 2003 (JP) ............................. 2003-048657

(51) Int. Cl.
*H01J 63/06* (2006.01)
(52) U.S. Cl. ...................... 313/497; 313/310; 313/495; 313/496
(58) Field of Classification Search ................ 313/311, 313/495, 496, 497, 310
See application file for complete search history.

(56) References Cited

U.S. PATENT DOCUMENTS

| | | | |
|---|---|---|---|
| 4,769,575 A * | 9/1988 | Murata et al. ............... | 313/495 |
| 6,097,138 A | 8/2000 | Nakamoto | |
| 6,621,232 B2 * | 9/2003 | Jo et al. .................. | 315/169.3 |
| 6,765,346 B2 * | 7/2004 | Lee et al. .................... | 313/497 |
| 2001/0025962 A1* | 10/2001 | Nakamoto ................... | 257/137 |
| 2004/0119396 A1* | 6/2004 | Lee et al. .................... | 313/495 |

FOREIGN PATENT DOCUMENTS

| | | |
|---|---|---|
| JP | 10-149760 | 6/1998 |
| JP | 11-265653 | 9/1999 |
| JP | 2002-025478 | 2/2002 |

* cited by examiner

*Primary Examiner*—Allen C. Ho
(74) *Attorney, Agent, or Firm*—Antonelli, Terry, Stout & Kraus, LLP.

(57) ABSTRACT

A structure is provided which facilitates manufacturing of a flat type image display element which includes electrodes capable of enhancing the display efficiency with an extremely small control electrode current using a cathode material which can obtain a sufficient intensity of electron emission in a low electric field. A structure is provided in which control electrodes and cathodes are formed substantially on a the plane on a first panel, while control electrode lines which electrically connect the control electrodes of a plurality of pixels are not included in the plane which is parallel to a phosphor screen panel and includes the cathodes and the control electrodes.

6 Claims, 9 Drawing Sheets

FLAT PANEL DISPLAY DEVICE WITH SURFACES OF CATHODES AND CONTROL ELECTRODES LYING IN THE SAME FLAT PLANE

BACKGROUND OF THE INVENTION

The present invention relates to a flat panel display device which includes electron beam sources having cathodes which emit electrons in response to an electric field and a phosphor screen which is excited by the electrons emitted from the electron beam sources; and, more particularly, the invention relates to a flat panel display device which uses a carbon-based material, such as carbon nanotubes, micro carbon fibers, diamond or the like, as cathodes which emit electrons with a low electric field.

Recently, as represented by diamond, carbon nanotubes or the like, electron emission materials have been found which can produce an emission of sufficient electrons with an extremely low electric field as compared to field-emission-type electron sources which use a conventional metal material as a main material. A flat panel display device which uses such an electron emission material as a material of the cathodes is described in patent literature 1 (Japanese Unexamined Patent Publication Hei11(1999)-265653), for example.

The flat panel display device described in this patent literature 1 is comprised of a first panel, which has a plurality of electron sources constituted of cathode lines made of a stripe carbon film disposed on a first substrate, and a second panel, which has phosphors arranged to face the above-mentioned carbon film cathode lines in a direction perpendicular to the carbon film cathode lines (or a crossing direction, this expression being used hereinafter) in a stripe pattern, and anode lines are provided on the second panel, which is laminated to the first panel. Further, by selecting portions of the cathode lines and the anode lines, electrons are emitted from the cathode lines at crossing points of these lines, thus making the above-mentioned corresponding phosphors emit light, whereby an image is displayed.

Further, another device which is different from the above-mentioned device is described in patent literature 2 (Japanese Unexamined Patent Publication Hei10(1998)-149760). In this patent literature 2, a flat panel display device is described which is comprised of a first panel, which forms stripe-like pull-out electrodes at positions close to stripe-like emitters (also referred to as cathodes), which are formed of an electron emission material having carbon nanotubes formed on a first substrate, wherein the pull-out electrodes are arranged in a direction perpendicular to the cathodes, and a second panel, which has phosphors on planer anodes which are formed on a second substrate laminated to the first panel.

By selecting respective portions of the pull-out electrodes and the cathodes and applying a voltage to these portions, electrons are emitted due to an electric field applied between the selected pull-out electrodes and the cathodes, thus making the phosphors formed on the planer anodes emit light so as to display an image.

Further, a basic structure of electrodes in which the distance from the cathode surfaces and the distance from the control electrode surfaces to the anodes are set to be substantially equal is described in patent literature 3 (Japanese Unexamined Patent Publication 2002-25478).

As mentioned above, with the use of carbon nanotubes as the electron emitting material, it is possible to generate electron beams with a relatively low electric field, and, hence, a flat panel display device can be readily obtained.

SUMMARY OF THE INVENTION

However, a flat panel display device having the structure described in patent literature 1 adopts a method in which some lines are selected from the cathode lines and the anode lines, respectively, and an electron emission is generated at the specified portions. Accordingly, it is necessary to change over the anode voltage, which is a high voltage of several hundreds V or several kV necessary for making the phosphors emit light, and, hence, it is impossible to prevent the drive circuit from becoming complicated. As a countermeasure, a technique in which the control electrodes are arranged at positions close to the cathodes and the electron emission is performed using an electric field generated by the potential difference between the control electrodes and the cathodes is described in patent literature 2.

In this technique, by setting the distance between the control electrodes and the cathodes to an extremely small value, the electric field necessary for generating an electron emission can be obtained even with a small potential difference. In this patent literature 2, the flat panel display device adopts a driving method in which an electron emission is generated at given positions by changing over the cathode voltage and the pull-out electrode voltage, which are relatively low voltages, without changing over the anode voltage, which is a high voltage. In this driving method, an electron emission is generated using an electric field which extends from the cathodes to the pull-out electrodes, and, hence, a portion of the electrons emitted from the cathodes is incident on the pull-out electrodes, whereby a pull-out electrode current is generated. Since the pull-out electrode current does not contribute to the light emission at all, there is a high possibility that the power consumption necessary for obtaining the required light emitting intensity will be increased.

A structure which is capable of reducing such a control electrode current is described in patent literature 3. In the display device described in patent literature 3, a cathode surface which emits electrons and a control electrode surface which controls the intensity of electrons are formed on substantially the same plane, and these surfaces are arranged to face a phosphor surface to which a high voltage is applied. In such an electrode structure, electrons emitted from the surface of the cathode advances to the phosphor surface without approaching the control electrode, and, hence, no control electrode current is generated in association with the incidence of electrons. With respect to the structure described in this patent literature 3, since the surface of the control electrode and the surface of the cathode are configured to be on substantially the same plane, it is impossible to arrange the control electrode lines and the cathode lines to form a matrix as disclosed in patent literature 2 by directly connecting a plurality of control electrodes and a plurality of cathodes with each other.

Accordingly, with respect to the technique described in patent literature 3, although the cathode surface which emits electrons and the control electrode surface form substantially the same plane, "lines which supply electrons to the cathode" which constitute the cathode lines are formed below the control electrodes, that is, they are formed at a position spaced far away from the plane which is formed by the cathode surface and the control electrode surface as viewed from the phosphor surface. By adopting such a structure, it is possible to form a matrix structure constituted of the cathodes and the control electrodes. However, since the driving voltage necessary for turning on or off the electrons emitted from the cathodes is lowered, the size of the cathodes is limited, and thus it is difficult to increase the width of branch portions which connect the cathodes and the cathode lines. Accordingly, it is difficult to fill a material which ensures electric conductivity, thus eventually giving rise to a possibility that an electrical contact failure arises.

Accordingly, it is an object of the present invention to provide a flat panel display device which produces an electron emission of high efficiency at a low voltage by setting the control electrode current to an extremely small value using diamond, carbon nanotubes, micro carbon fibers or the like as cathodes.

To achieve the above-mentioned object, the present invention adopts a driving method in which an electric field necessary for electron emission is applied in response to a potential difference between cathodes and anodes which constitute a light emitting surface, and the electron emission is controlled by cutting off the electric field in response to a voltage applied to the control electrodes. More particularly, the present invention adopts a structure in which the control electrodes and the cathodes are formed on substantially the same plane. Due to such a structure, it is possible to obtain a flat panel display device of high efficiency and which employs a low control voltage and can be manufactured readily.

As a specific constitutional feature of the present invention, a flat panel display device includes a first panel having a plurality of electron beam sources which are arranged in a matrix array, the electron beam sources being constituted of cathodes which emit electrons and control electrodes which are electrically insulated from the cathodes and control the quantity of electrons emitted from the cathodes. There are a plurality of cathode lines and a plurality of control electrode lines which, in a state in which the cathodes and the control electrodes which constitute respective electron beam sources are respectively separated into a plurality of sets, electrically connect the cathodes and the control electrodes for the respective sets. The electron beam sources designated by respectively selecting some of the cathode lines and the control electrode lines are caused to emit electrons. The flat panel display device also has a second panel having phosphors which emit light upon receiving the electrons emitted from the electron beam sources corresponding to the arrangement of the electron beam sources.

The cathodes and the control electrodes are arranged on the first panel in a first flat cross-sectional plane which is parallel to the second panel, and, further, the control electrode lines are arranged in a second cross-sectional plane which differs from and is spaced from the first cross-sectional plane which is in contact with the cathodes and the control electrodes.

DESCRIPTION OF THE PREFERRED EMBODIMENTS

Preferred embodiments of the present invention will be explained in detail hereinafter in conjunction with the drawings. In the following description of the embodiments, specific sizes are used as only one example for purposes of illustration.

First Embodiment

Figure 1:
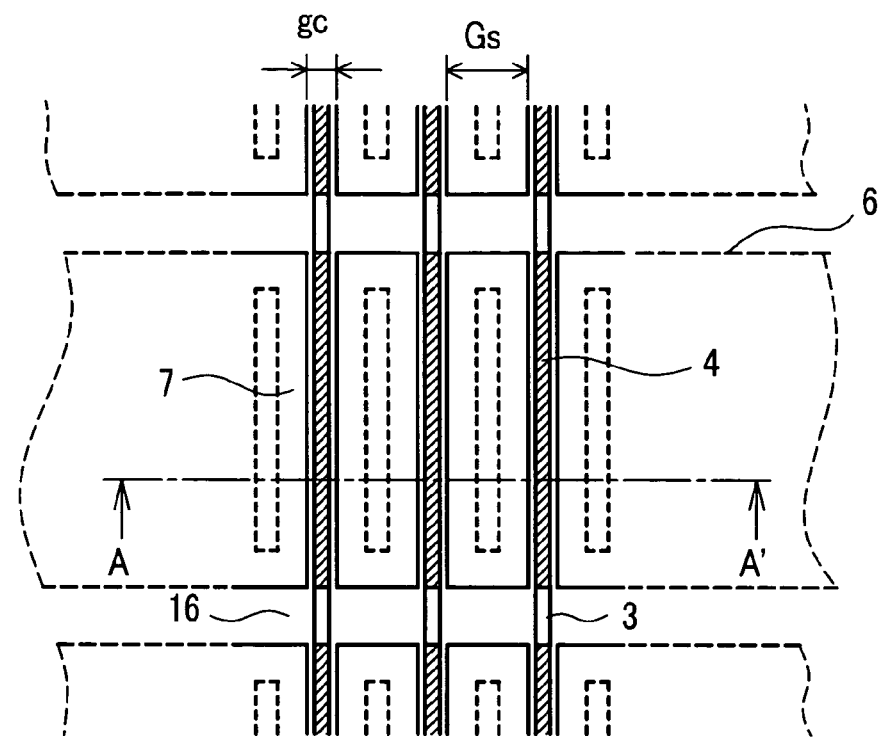
FIG. 1 is a plan view of part of a first panel showing some control electrodes and some cathodes in a flat panel display device according to the present invention having the electrode structure in which the control electrodes and the cathodes are arranged on substantially the same plane.

A first embodiment will be explained in conjunction with FIG. 1 to FIG. 6. FIG. 1 is a plan view of part of a first panel showing some control electrodes and some cathodes of a flat panel display device according to the present invention, having an electrode structure in which the control electrodes and the cathodes are arranged on substantially the same plane (the first panel also will be referred to as the electron beam source panel, hereinafter).

Figure 6:
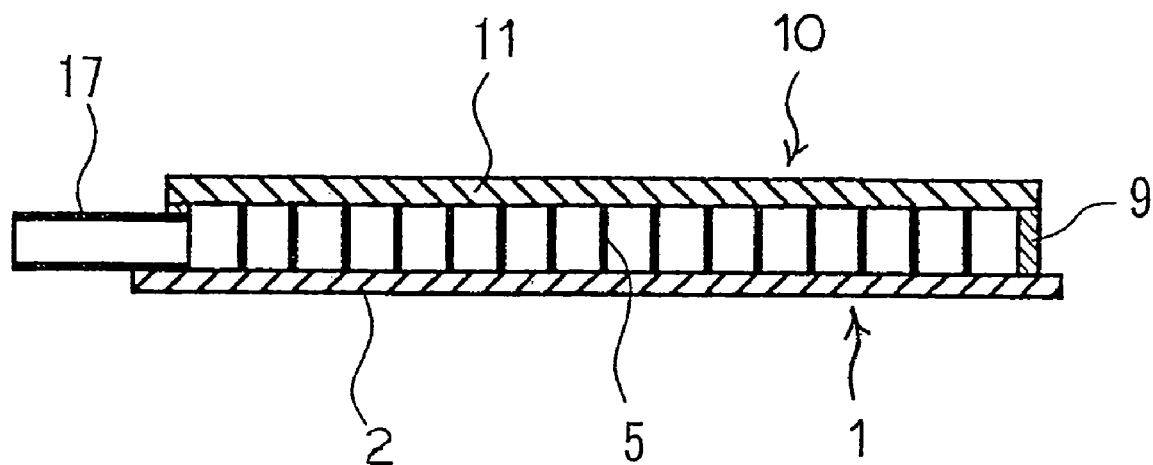
FIG. 6 is a schematic cross-sectional view showing the structure of a flat panel display device which is formed by laminating a first panel and a second panel to each other.

In this embodiment, control electrodes 7 and cathodes 4 are formed on a substrate 2 which constitutes an electron beam source panel 1, the electron beam source panel 1 constituting a first panel of a flat panel display device, as shown in FIG. 6. Here, this embodiment has an electrode structure in which the control electrodes 7 and cathodes 4 are substantially formed on the same plane. The electron beam source panel 1 is configured by forming the cathodes 4, the control electrodes 7 and the like on the substrate 2, which is preferably made of glass (also referred to as the electron beam source panel glass substrate hereinafter). On the electron beam source panel glass substrate 2, control electrode lines 6, each having a width of 250 μm, are formed by screen printing using a conductive paste that is preferably made of a silver paste (hereinafter, the term "silver paste" refers to this type of material). On the control electrode lines 6, first of all, for connecting the control electrode lines 6 and the control electrodes 7, branch lines 8 are formed using a silver paste, such that the branch lines 8 each have a length of 200 μm, a height of 60 μm and a width of 30 μm. Further, on the control electrode lines 6, an insulation layer 16 is formed over the whole area of a region corresponding to a region where an image is displayed using a dielectric paste such that the insulation layer 16 has the same height as the branch lines 8.

Here, while the branch lines 8 and the control electrodes 7 can be formed separately as described above, they also can be formed simultaneously as described hereinafter. That is, as shown in FIG. 3, the insulation layer 16 is formed such that the portions where the branch lines 8 are to be formed are removed after formation of the insulation layer 16 or the branch forming portions are preliminarily removed; and, thereafter, a silver paste is filled in the branch forming portions at the time of printing the control electrodes 7, thus integrally forming the branch lines 8 and the control electrodes 7. Other constitutions are the same as those shown in FIG. 2(a) and FIG. 2(b).

On the flat insulation layer 16 obtained in this manner, cathode lines 3 are formed, each having a width of 40 μm in the longitudinal direction in FIG. 1, and the control electrodes 7 which sandwich each cathode line 3 therebetween while ensuring a gap of 20 μm are formed by printing using a silver paste, wherein the control electrodes 7 are electrically connected to the branch lines 8. After baking such a structure by heating, a paste containing approximately 10% by weight of carbon nanotubes pulverized to a size equal to or less than 1 μm is printed on regions of the cathode lines 3, each of which is sandwiched by the control electrodes 7 and is baked by heating, thus forming the cathodes 4 having a rectangular pattern. Here, by setting the film thickness of the control electrodes 7 to 10 μm and the film thicknesses of the cathode lines 3 and the cathodes 4 to 5 μm, as shown in FIG. 2(a) and FIG. 2(b), the surfaces of the control electrodes 7 and the cathodes 4 are made substantially coplanar.

On the glass substrate 2 of the electrode source panel 1, including the control electrodes 7 and the cathodes 4 produced in the above-mentioned manner, partition walls 5, each having a height of 3 mm, for example, as shown in FIG. 6, are temporarily fixed at positions which do not impede the emission of electrons, using frit glass. Further, a frame 9, a phosphor screen panel 10, which is preferably made of glass, and the electron beam source panel 1 are assembled using frit glass, and they are fixed by heating, thus manufacturing the flat panel display device having the structure shown in FIG. 6.

As the phosphor screen panel 10, this embodiment uses a phosphor screen panel in which, on a phosphor screen panel glass substrate 11, which is preferably made of transparent glass and has a structure as shown in FIG. 4(a) and FIG. 4(b), phosphor films 12, a light shielding film (a black matrix: a BM layer) 13 and anodes 14 are formed. The phosphor screen panel 10 is obtained by patterning the black matrix 13 on the phosphor screen panel glass substrate 11 and, thereafter, forming the phosphor films 12 in openings of the black matrix 13, and forming the anodes 14, which are made of a metal layer (for example, aluminum), on the phosphor films 12. The anode 14 side is arranged to face the electron beam source panel 1 and is laminated to the electron beam source panel 1 by way of the partition walls 5. The inside of the manufactured flat panel display device is evacuated through an exhaust pipe 17, and, thereafter, the exhaust pipe 17 is melted and sealed. Here, the respective phosphor films correspond to respective unit pixels, and, in a full color display, pixels of red, green and blue constitute one color pixel.

Further, in FIG. 4(a) and FIG. 4(b), the anodes 14 which constitute the phosphor screen panel 10 are formed as an uppermost layer (over the phosphor screen) of the phosphor screen panel glass substrate 11. However, as shown in FIG. 5(a) and FIG. 5(b), it is possible that, first of all, the anodes 14 are formed on the phosphor screen panel glass substrate 11 and, thereafter, the black matrix 13 and the phosphor films 12 are formed on the anodes 14. However, in this case, it is necessary to use a transparent electrode as the anodes 14. Further, in FIG. 4(a) and FIG. 4(b) as well as in FIG. 5(a) and FIG. 5(b), the anodes 14 may be in a so-called mat configuration in place of being in a stripe configuration.

In the flat panel type image display device according to this embodiment, when a voltage of 10 kV is applied to the anodes 14, a voltage of the control electrodes 7 is set to 0V and a voltage of the cathodes 4 is set to 0V, an electron emission is generated; while, when the voltage of control electrodes 7 is set to −50V and the voltage of the cathodes 4 is set to 50V, the electron emission can be stopped. Even when the voltage of either one of the control electrodes 7 and the cathodes 4 is set to 0V from such a state, it is also possible to stop the electron emission, and, hence, a so-called matrix operation can be performed.

Further, in this embodiment, on the electron beam source panel 1, the cathodes 4 and the control electrodes 7 are arranged such that, out of flat cross-sectional planes which are parallel to the phosphor screen panel 10, a cross-sectional plane which is brought into contact with the cathodes 4 and the control electrodes 7 is present, and a cross-sectional plane including the control electrode lines 6 is formed different from the cross-sectional plane which is brought into contact with the cathodes 4 and the control electrodes 7. That is, in this embodiment, as shown in FIG. 2(a), the surfaces of the control electrodes 7 and the cathodes 4 are arranged substantially coplanar with each other, while the control electrode lines 6 are configured to be in a plane different from the plane including the above-mentioned control electrodes 7 and the cathodes 4.

According to this embodiment, it is possible to provide a flat type display device which can perform sufficient electron emission at a low voltage, which requires an extremely small control electrode current and which can obtain an electron emission of high efficiency.

Second Embodiment

Figure 7:
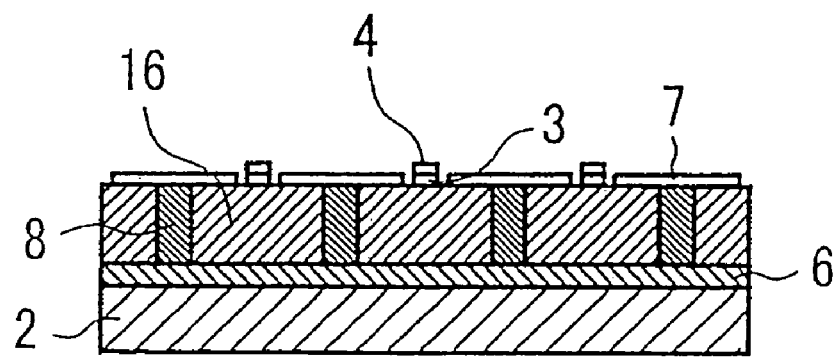
FIG. 7 is a cross-sectional view similar to FIG. 2($a$) and showing a second embodiment of the present invention in which the cathodes are formed on cathode lines which are simultaneously formed with control electrodes.
Figure 8:
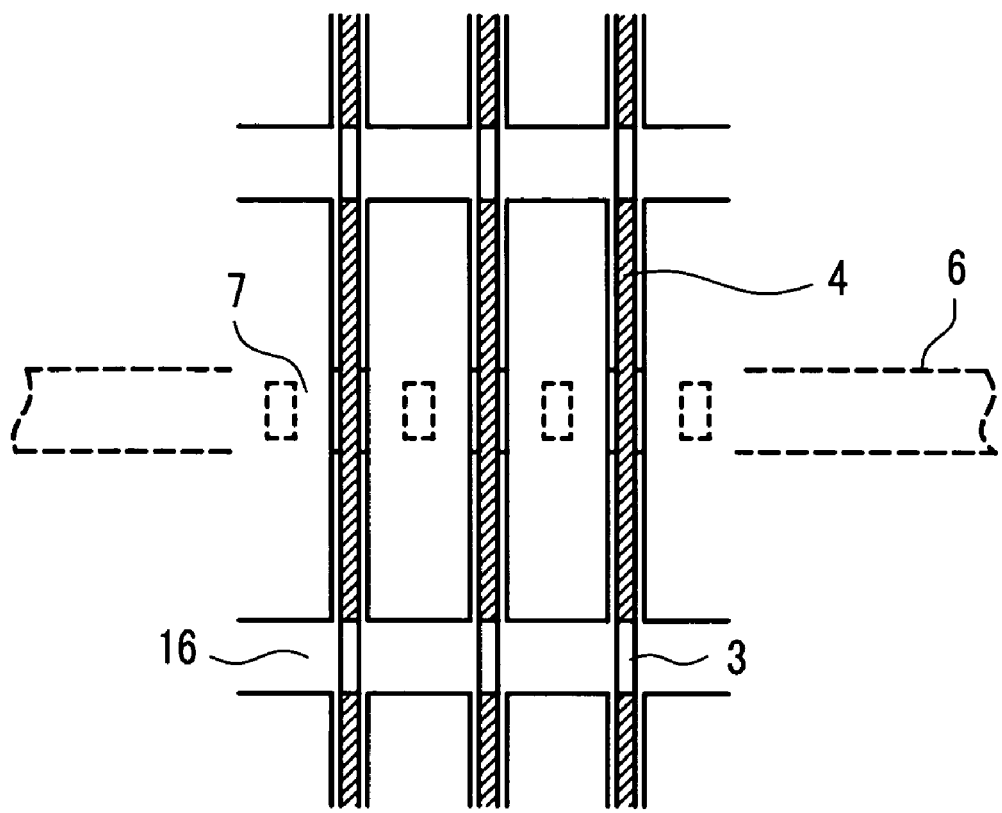
FIG. 8 is a plan view similar to FIG. 1 showing an electrode structure in which the control electrode lines are narrowed.

A second embodiment of the present invention will be explained in conjunction with FIG. 7 and FIG. 8. Although the surfaces of the control electrodes 7 and the cathodes 4 are arranged substantially coplanar with each other in the above-mentioned first embodiment, even when the difference in height between the surface of the cathodes 4 and the surface of the control electrodes 7 is equal to approximately the thickness of the control electrodes 7, it is possible to obtain an advantageous effect similar to the advantageous effect obtained by the first embodiment. FIG. 7 is a cross-sectional view which substantially corresponds to FIG. 2(a) for showing the second embodiment of the present invention in which the cathodes 4 are formed on the cathode lines 3, which are simultaneously formed with the control electrodes 7. Further, FIG. 8 is a plan view similar to FIG. 1 and shows an electrode structure in which the control electrode lines 6 are formed with a narrow width.

That is, in FIG. 7, the control electrodes 7 and cathode lines 3, each having a thickness of 5 µm, are simultaneously formed by printing, and, thereafter, the cathodes 4 having a thickness of 5 µm are formed on the cathode lines 3, such that the control electrodes 7 have a thickness of 5 µm and the combined thickness of the cathode lines 3 and the cathodes 4 is set to 10 µm. In this case, it is also possible to have a similar advantageous effect to that achieved by the first embodiment.

Figure 2:
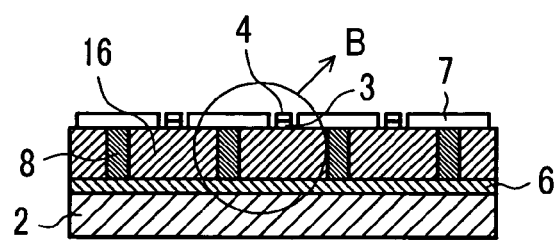
FIG. 2($a$) and FIG. 2($b$) are cross-sectional views showing one example of the electrode structure in the vicinity of the cathode, in which FIG. 2($b$) is an enlarged view of the portion B in FIG. 2($a$)
Figure 2:
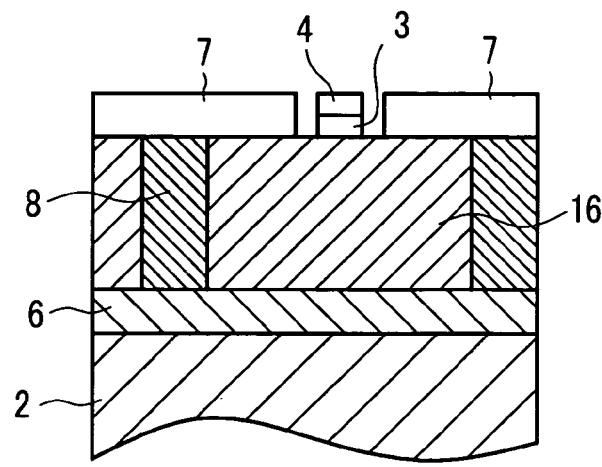
Figure 3:
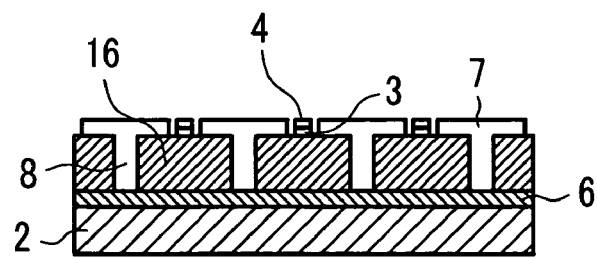
FIG. 3 is a cross-sectional view taken along a line A-A' in FIG. 1 showing another example of the electrode structure in the vicinity of the cathode.
Figure 4:
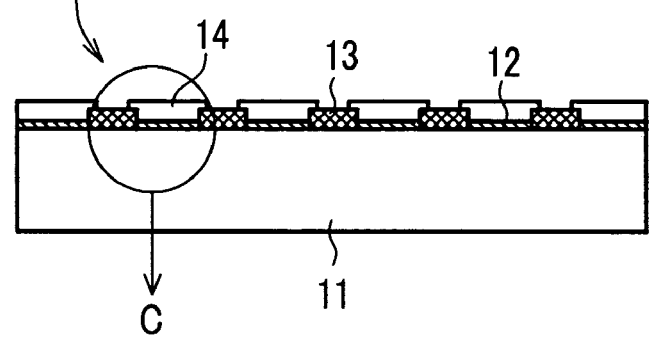
FIG. 4($a$) and FIG. 4($b$) are cross-sectional views of one example of a second panel on which anodes and phosphors are formed, in which FIG. 4($b$) is an enlarged view of the portion C in FIG. 4($a$)
Figure 4:
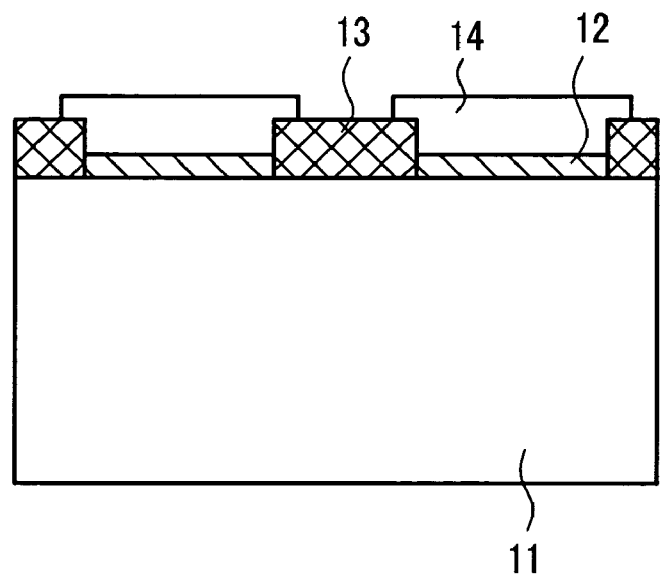
Figure 5:
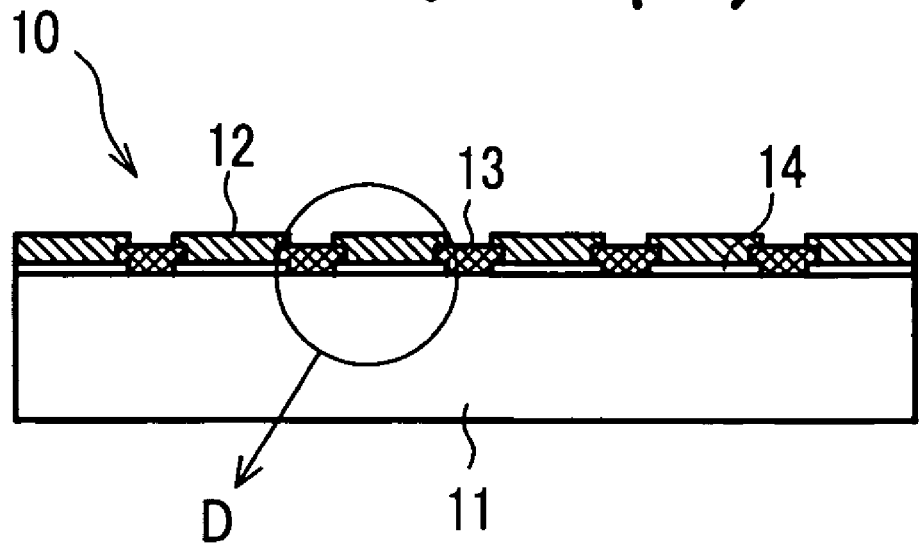
FIG. 5 ($a$) and FIG. 5($b$) are cross-sectional views of another example of the second panel on which anodes and phosphors are formed, in which FIG. 5($b$) is an enlarged view of the portion D in FIG. 5($a$)
Figure 5:
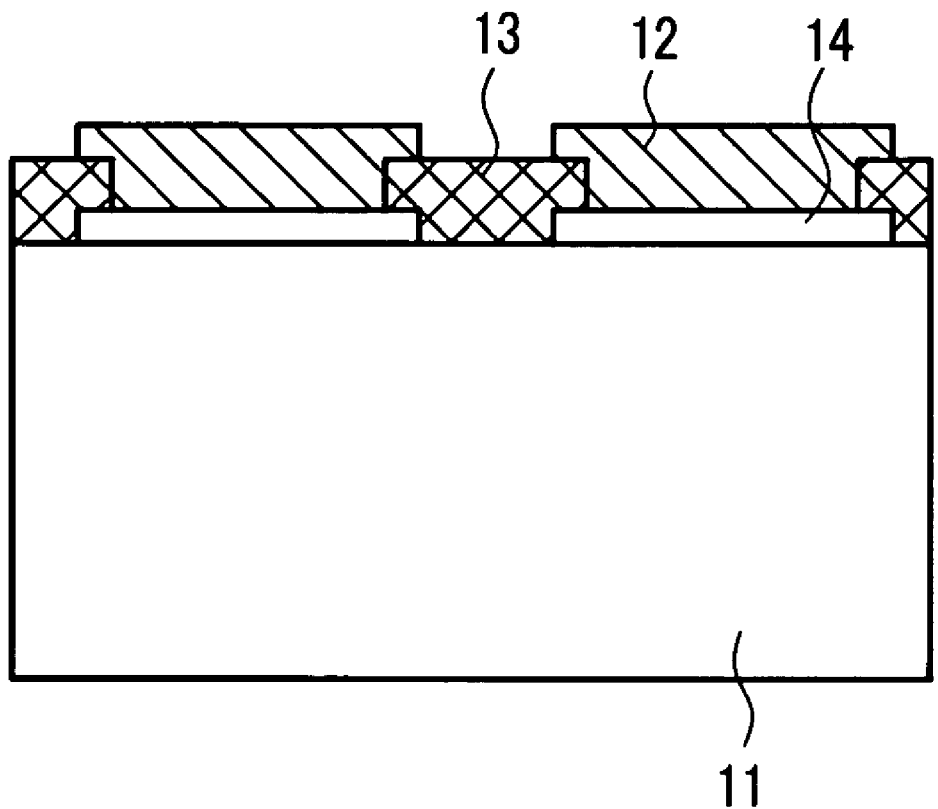

Here, as described in conjunction with the first embodiment of the present invention with reference to FIG. 1 to FIG. 3, when the width of the control electrode lines 6 is set substantially as wide as the width of the control electrodes 7, it is possible to increase the cross-sectional area of the branch lines 8; and, hence, the electrical conductivity between the control electrode lines 6 and the control electrodes 7 can be easily ensured, thus leading to an enhancement of the reliability. On the other hand, as shown in FIG. 8, by narrowing the width of the control electrode lines 6, it is possible to decrease the floating capacitance between the cathode line 3 and the control electrode line 6, and, hence, it is possible to perform more rapid driving. To achieve the latter object, it is also effective to increase the thickness of the insulation layer 16. By combining these features, it is possible to obtain a flat panel image display element which is conformable to the desired object.

Also, in this embodiment, it is possible to provide a flat panel type display device which can produce a sufficient electron emission at a low voltage, which requires an extremely small control electrode current and which can obtain an electron emission of high efficiency.

Third Embodiment

Figure 9:
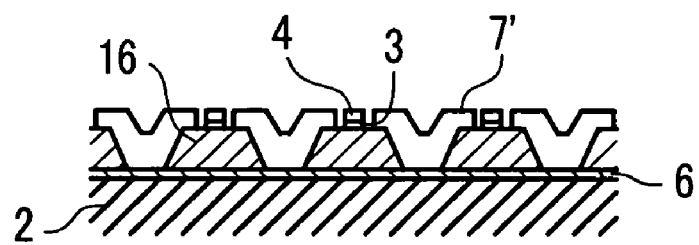
FIG. 9 is a cross-sectional view similar to FIG. 2($a$) showing a third embodiment of the present invention in which control electrodes and branch lines are integrally formed.

A third embodiment of the present invention will be explained in conjunction with FIG. 9. FIG. 9 is a cross-sectional view similar to FIG. 2(a) showing the third embodiment of the present invention in which the control electrodes and the branch lines are integrally formed. In the above-mentioned embodiments, when it is possible to ensure a large area for the control electrodes 7 due to a large pixel pitch or the like, the branch lines 8 are not formed and the insulation layer 16 is formed while obviating regions corresponding to the branch lines 8; and, thereafter, a conductive paste is injected into the regions corresponding to the branch lines 8 at the time of forming the control electrodes 7 by printing, thus forming the structure shown in FIG. 9. Due to such a constitution, integral-type control electrodes 7' which correspond to the branch lines 8 and the control electrodes 7 are formed.

Also, in this embodiment, it is possible to provide a flat panel type display device which can produce sufficient electron emission at a low voltage, which requires an extremely small control electrode current and which can obtain an electron emission of high efficiency. Further, adopting the structure of this embodiment also can simplify the manufacturing steps.

In this type of flat panel display device, the driving voltage necessary for controlling the intensity of electron emission from the cathodes 4 is defined by a gap between end portions of the control electrodes 7 at sides which face the cathodes 4. The size of the gap between the control electrodes is determined based on the width of the cathode 4 per se and the respective gaps between the control electrodes 7 and the cathode 4. The decrease of the gap between the control electrode 7 and the cathode 4 is limited due to the dielectric strength characteristics with respect to a voltage applied between the cathode 4 and the control electrode 7. Accordingly, to lower the driving voltage, there is no other way but to reduce the width of the cathode 4. However, when the cathode lines 3 are formed as a separate layer from the cathodes 4 departing from the present invention, it is necessary to form the branch line 8 within a region of the cathode 4 having a limited width and to connect the branch line 8 with the cathode line 3, and, hence, it is difficult to ensure sufficient electrical conductivity.

The main feature of the above-mentioned respective embodiments to achieve the objects of the present invention lies in the fact that the cathode lines 3 are formed on the plane on which the cathodes 4 which emit electrons and the control electrodes 7 are formed, the control electrode lines 6 are formed on a separate layer which differs from the above-mentioned plane with respect to the distance from the phosphor screen panel 10, and the control electrode lines 6 are connected with the control electrodes 7 through branch lines 8. For example, as seen in FIG. 1, the influence of the control electrodes 7 on the driving voltage is mainly attributed to a gap gc between the neighboring control electrodes 7 at the sides sandwiching the above-mentioned cathode 4, while the influence of the control electrode 7 on the driving voltage attributed to the length Gs of the control electrodes 7 at the portion which is sandwiched by the cathode 4 and another cathode 4 at another end is small. Accordingly, by adopting a structure in which the branch lines 8 are arranged at such portions, it is possible to ensure sufficient regions for ensuring sufficient electrical conductivity and for facilitating the manufacture of the flat panel display device without hardly giving an adverse influence on the required driving voltage.

In the above-mentioned embodiments, compared to the fact that the width of the cathode 4 or the cathode line 3 is only 40 µm, a length of 160 µm or more is ensured as the length Gs of the control electrode 7 located between the neighboring pixels, and the branch line 8 can be easily arranged in such a region. Further, in the above-mentioned respective embodiments, the cathode lines 3, the control electrodes 7 and the control electrode lines 6 are formed by screen printing using a thick silver film. However, provided that the required electric conductivity is ensured, even when a conductive material other than silver is used or a conductive film is formed by another technique (for example, formation of thin films by vapor deposition), it is possible to obtain the advantageous effects of the present invention in the exactly same manner. Further, although the cathodes 4 are formed using a paste containing carbon nanotubes in this embodiment, it is evident that similar advantageous effects can be obtained using other electron source material which can provide substantially the required intensity of electron beams using an electric field generated by the potential difference applied between the anodes 14 and the cathodes 4.

Fourth Embodiment

Figure 10:
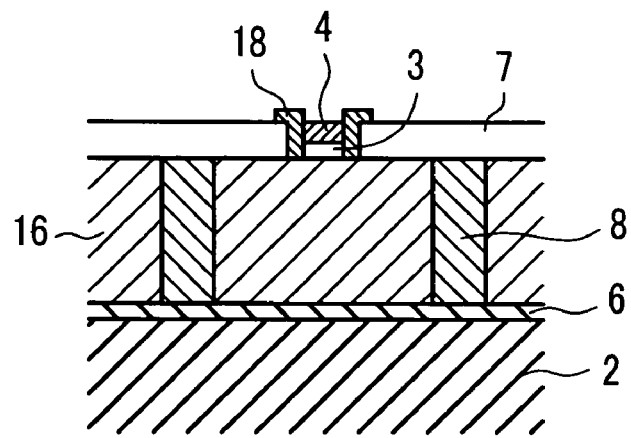
FIG. 10 is a cross-sectional view similar to FIG. 2($b$) showing the electrode structure of a fourth embodiment of the present invention having insulation partition walls between control electrodes and cathodes.

A fourth embodiment of the present invention will be explained in conjunction with FIG. 10. FIG. 10 is a cross-sectional view similar to FIG. 2(b) showing the electrode structure of the fourth embodiment of the present invention, which includes an insulation partition wall between the control electrode and the cathode. To lower the driving voltage as much as possible, it is necessary to narrow the gap between the control electrode 7 and the cathode 4 as much as possible. However, when the gap between the control electrode 7 and the cathode 4 is narrowed, the dielectric strength characteristics with respect to the potential difference between both electrodes is lost. The fourth embodiment of the present invention, which copes with such a drawback, will be explained in conjunction with FIG. 10. In the same manner as the first embodiment, silver electrodes are formed in regions of the control electrodes 7 and the cathode lines 3 by printing, and, thereafter, insulation partition walls 18 are formed in regions surrounded by the control electrodes 7 and the cathode lines 3 using a dielectric paste. Thereafter, the cathodes 4 are formed on the cathode lines 3. Then, by performing the subsequent steps in the same manner as the first embodiment, a flat-type image display element is manufactured.

In the first embodiment, which is not provided with the insulation partition walls 18, when a potential difference of approximately 150V is applied between the control electrode 7 and the cathode 4, a leakage current amounting to several tens % of the electron emission intensity is detected between both electrodes. To the contrary, in this embodiment which is provided with the insulation partition walls 18, when a material having the specific resistance of approximately 100MΩ is used as the insulation partition wall material and a potential difference of approximately 200V is applied between the control electrode 7 and the cathode 4, a leakage current amounting to only 1% or less of the electron emission intensity is detected, and, hence, it is possible to obtain a flat panel display element of high reliability. Further, by forming the insulation partition walls 18 using a material which exhibits a high insulation property, it is evident that the leakage current, which is a reactive current, can be further reduced. With respect to other advantageous effects, this embodiment also can achieve these advantageous effects in the same manner as the previous embodiments.

Fifth Embodiment

Figure 11:
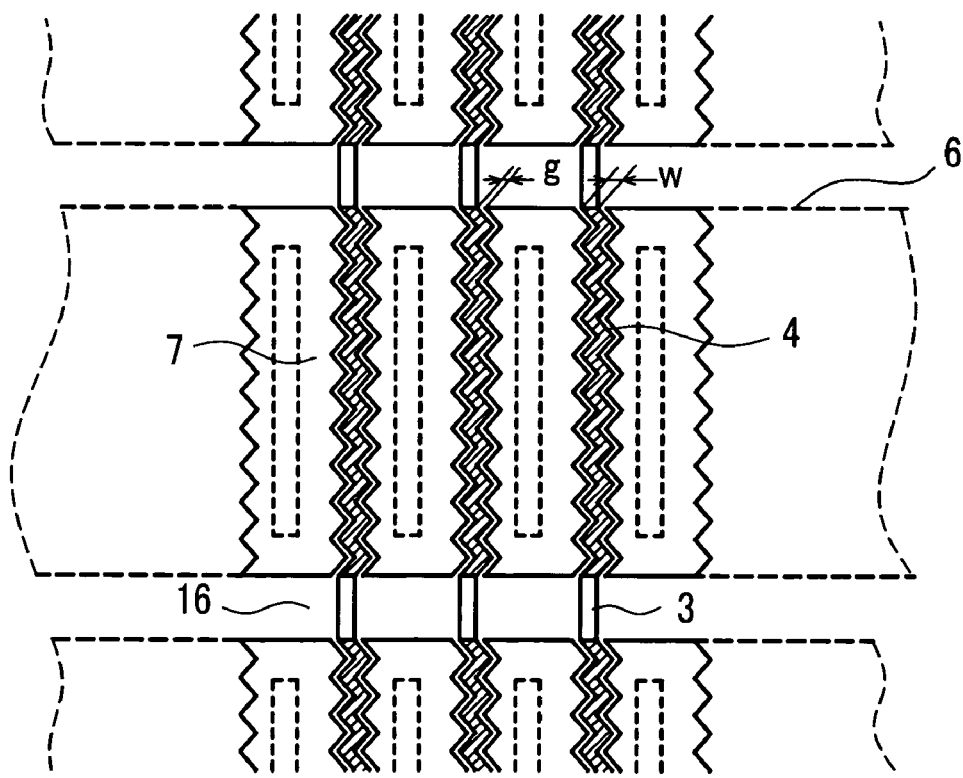
FIG. 11 is a plan view similar to FIG. 1 showing a cathode-control electrode structure having a triangular wave pattern that is capable of performing low-voltage driving.
Figure 12:
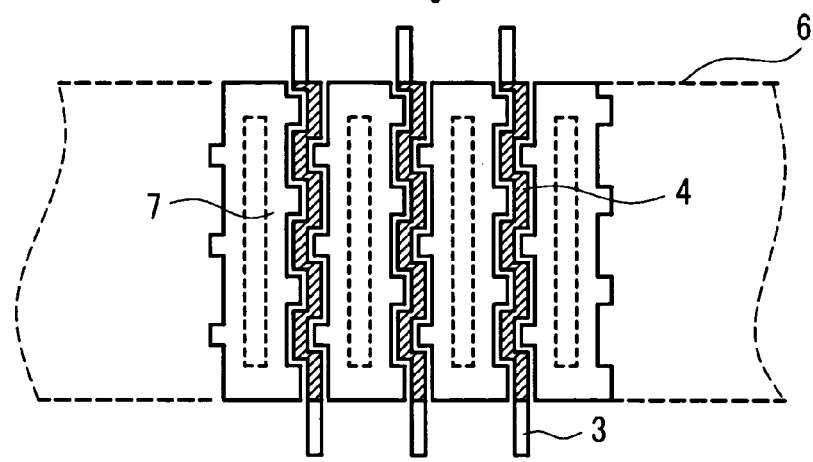
FIG. 12 is a plan view of a cathode-control electrode structure having a rectangular wave pattern capable of performing a low-voltage driving.
Figure 13:
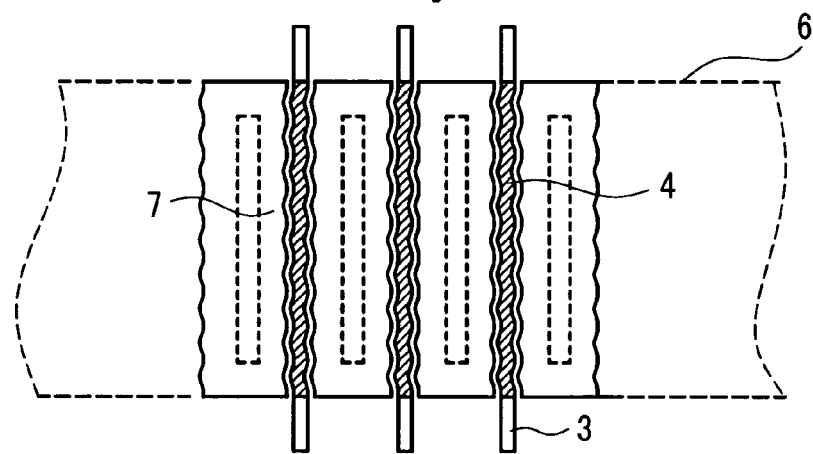
FIG. 13 is a plan view of a cathode-control electrode structure having a rectangular wave pattern capable of performing a low-voltage driving.
Figure 14:
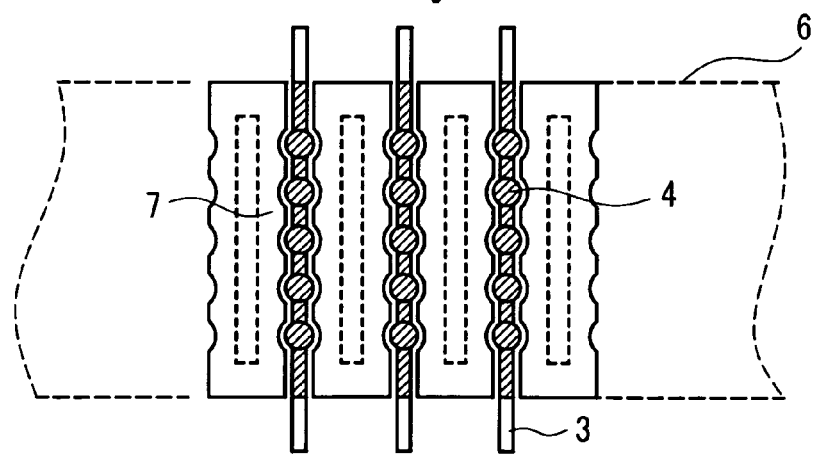
FIG. 14 is a plan view of a cathode-control electrode structure having a spit-dumpling-like wave pattern capable of performing a low-voltage driving.

A fifth embodiment of the present invention will be explained in conjunction with FIG. 11 to FIG. 14. FIG. 11 is a plan view similar to FIG. 1 showing a cathode-control electrode structure having a triangular wave pattern that is capable of performing low-voltage driving; FIG. 12 is a plan view of a cathode-control electrode structure having a rectangular wave pattern that is capable of performing low voltage driving; FIG. 13 is a plan view of a cathode-control electrode structure having a wave pattern that is capable of performing low voltage driving; and FIG. 14 is a plan view of a cathode-control electrode structure having a spit-dumpling-like wave pattern that is capable of performing low voltage driving.

In the above-mentioned first embodiment, the cathode lines 3 are formed in a strip shape such that end portions thereof form a straight line parallel to the width of the control electrodes 7 arranged perpendicular to the longitudinal direction of the control electrode line 6. In this embodiment, however, the cathode lines 3 are bent to have such a shape that a facing portion of an end portion of the control electrode 7 and an end portion of the cathode 4 has a length longer than the width of the control electrode 7. Due to such a constitution, it is possible to reduce the driving voltage. FIG. 11 shows a case in which the cathode line 3 has a triangular wave pattern which has end portions thereof inclined by 45 degrees with respect to the widthwise direction of the control electrode 7. The size of the cathodes 4 follows the rectangular pattern shown in FIG. 1 and the width w thereof is set to 40 μm, and the gap g between the control electrode 7 and the cathode line 3 is set to 20 μm.

As mentioned previously, in a flat plate image display device using the rectangular pattern indicated in FIG. 1, it is necessary to set the voltage amplitude of the control electrodes 7 to 40V and the voltage amplitude of the cathodes to 40V to control the electron emission quantity. To the contrary, in a flat panel display device which uses the triangular wave pattern shown in FIG. 11, the electron emission is generated when a voltage of 10 kV is applied to the anodes 14, the voltage of the control electrode 7 is set to 0V and the voltage of the cathode 4 is set to 0V, while the electron emission is stopped when the voltage of the control electrode 7 is set to −35V and the voltage of the cathode 4 is set to 35V. Further, even when the voltage of either one of the control electrodes 7 and the cathodes 4 is set to 0V, the electron emission can be stopped. This is attributed to the fact that, by forming the pattern of the cathodes 4 in an oblique shape with respect to the widthwise direction of the control electrodes 7, the width of the cathodes 4 can be substantially reduced and, at the same time, an effect that the control electrodes 7 surround the cathodes 4 is increased.

Accordingly, beside the triangular wave shape of this embodiment, with the use of a rectangular wave pattern as shown in FIG. 12, a wavy pattern constituted of curves shown in FIG. 13 or a spit-dumpling pattern which widens the width of portions of the cathode 4 and narrows the width of other portions of the cathode 4 and widens portions of the gap between the control electrodes 7 so as to 7 surround the cathode 4, it is possible to obtain similar advantageous effects.

Also in this embodiment, it is possible to provide a flat panel type display device which can produce sufficient electron emission at a low voltage, which requires an extremely small control electrode current and which can obtain an electron emission of high efficiency.

Sixth Embodiment

Figure 15:
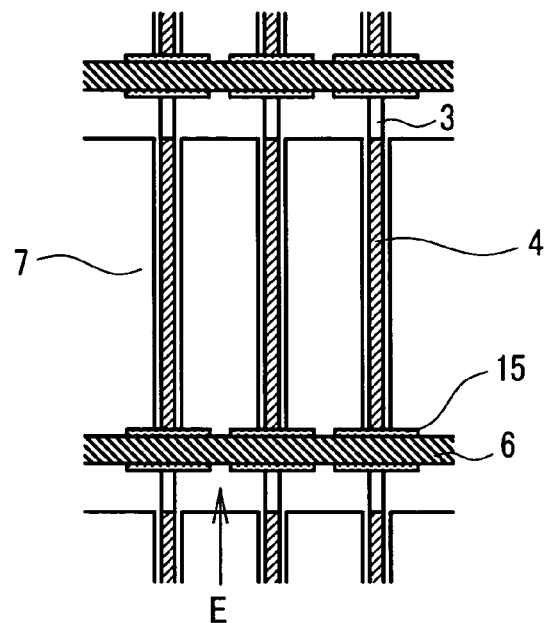
FIG. 15 is a plan view of an electrode structure in which the control electrode lines are formed above the control electrodes.
Figure 16:
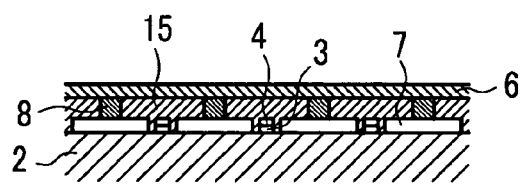
FIG. 16 is a cross-sectional view of the side-face structure of the electrode structure shown in FIG. 15, as viewed in the direction of arrow E.
Figure 17:
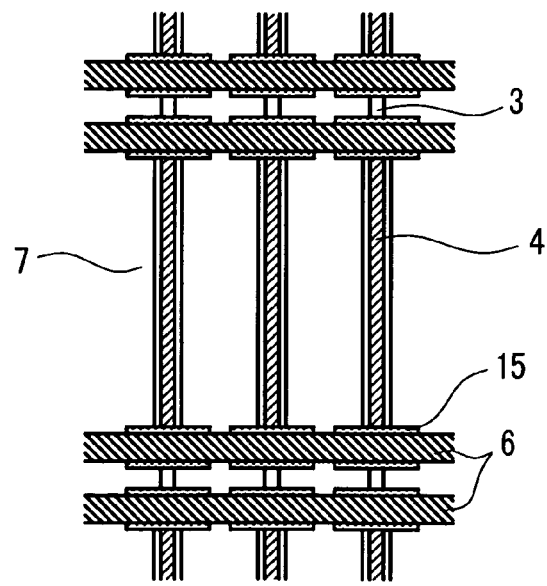
FIG. 17 is a plan view of an electrode structure having two control electrode lines.

A sixth embodiment of the present invention will be explained in conjunction with FIG. 15 to FIG. 17. FIG. 15 is a plan view of an electrode structure in which the control electrode lines 6 are arranged above the control electrodes 7; FIG. 16 is a cross-sectional view of the side-face structure of the electrode structure shown in FIG. 15, as viewed in the direction of arrow E; and FIG. 17 is a plan view of an electrode structure having two control electrode lines. The electrode structure includes the control electrodes 7 and the cathodes 4, wherein a matrix structure can be formed if there are no control electrode lines 6 on a plane parallel to the phosphor screen panel 10, and the control electrode lines 6 can be formed at a side closer to the phosphor screen panel 10 than to the plane. In FIG. 15 and FIG. 16, the electrode structure is formed such that the cathodes 4 and the control electrodes 7 are formed, and, thereafter, the control electrode lines 6 are formed to bridge the respective control electrodes 7.

In this embodiment, on the electron beam source panel glass substrate 2, the electrode structure having a rectangular pattern similar to the pattern shown in FIG. 1 is formed by screen printing using silver. Thereafter, a dielectric paste is formed on the electrode structure by printing a dielectric paste such that the dielectric paste covers the cathodes 4, each of which is sandwiched by widthwise-directional end portions of the control electrodes 7, thus forming an insulation coating 15. Then, the control electrode lines 6 having a width of 50 µm are formed on the insulation coating 15 by printing a silver paste. Further, the partition wall 5 having a height of 3 mm is fixed between the control electrodes 7 using frit glass, and, in the same manner as the above-mentioned embodiments, the frame 9, the phosphor screen panel 10 and the electron beam source panel 1 are assembled using frit glass and are fixed by heating.

Also, with the use of the structure of this embodiment, it is possible to obtain a flat type image display device which can be driven with a low driving voltage in the same manner as the first embodiment. Although the number of bridging control electrode lines 6 is set to only one per one line, as shown in FIG. 17, the number of bridging control electrode lines 6 may be set to two per one line, and these control electrode lines 6 may be arranged at both ends of the pixel. By forming the control electrode lines 6 at both ends of the pixel, the symmetry of the control electrode lines 6 with respect to the center of the pixel is enhanced whereby the loci of the electrons can be further stabilized.

Also, in this embodiment, it is possible to provide a flat panel type display device which can produce sufficient electron emission at a low voltage, which requires an extremely small control electrode current and which can obtain an electron emission of high efficiency.

Seventh Embodiment

Figure 18:
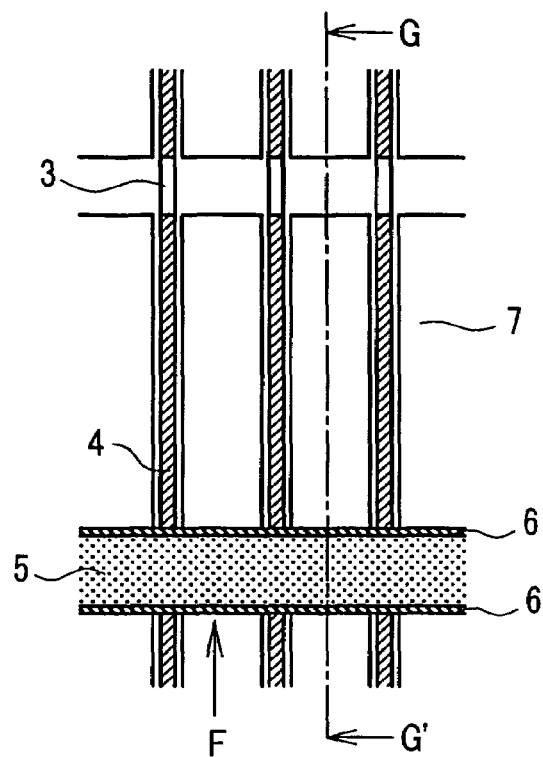
FIG. 18 is a plan view of an electrode structure having partition walls provided with control electrode lines.
Figure 19:
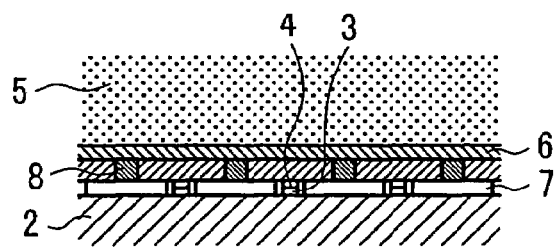
FIG. 19 is a cross-sectional view of the side structure of the electrode structure shown in FIG. 18, as viewed in the direction of arrow F.
Figure 20:
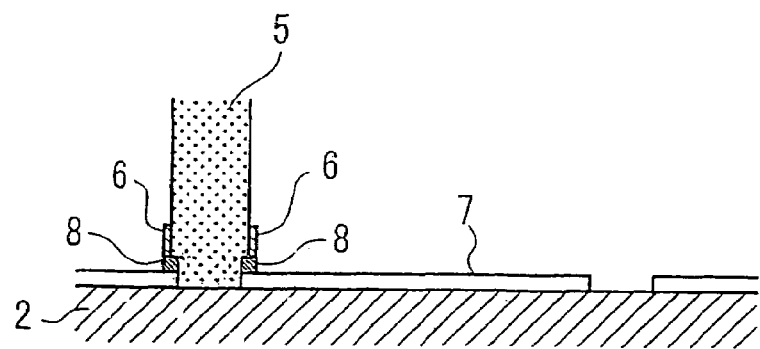
FIG. 20 is a cross-sectional view taken along a line G-G' of the electrode structure shown in FIG. 18.

The seventh embodiment of the present invention will be explained in conjunction with FIG. 18 to FIG. 20. FIG. 18 is a plan view of the electrode structure having partition walls 5 provided with control electrode lines 6. FIG. 19 is a cross-sectional view of the side-face structure as viewed in the direction of arrow F of the electrode structure shown in FIG. 18, and FIG. 20 is a cross-sectional view taken along a line G-G' of the electrode structure shown in FIG. 18. In this embodiment, as shown in FIG. 18, FIG. 19 and FIG. 20, the flat panel display device is formed by directly arranging the partition walls 5 provided with the control electrode lines 6 at the widthwise-directional end portions of the control electrodes 7 without forming the insulation coating 15 and the control electrode lines 6 on the control electrodes 7 and the cathodes 4.

In this embodiment, by printing a silver paste to regions having a width of 50 µm at a position spaced 50 µm to 100 µm away from an end portion of each partition wall 5 having a height of approximately 3 mm, the control electrode lines 6 are formed. Further, the branch line 8 portions having a width of 50 µm for connection with the respective control electrodes 7 are formed between the control electrode lines 6 and the end portion of the partition wall 5. However, it is evident that even when the control electrode lines 6 and the branch lines 8 may be formed by printing using, another conductive material or by another technique, it is possible to obtain similar advantageous effects. Further, to ensure the electrical connection between the branch lines 8 and the control electrodes 7, it is effective to preliminarily apply particles having a conductivity at least on surfaces of the control electrodes 7 which are brought into contact with the branch lines 8.

Also, with the use of the structure of this embodiment, it is possible to obtain a flat type image display device which can be driven with a low driving voltage in the same manner as the first embodiment.

Also, in this embodiment, it is possible to provide a flat panel type display device which can produce sufficient electron emission at a low voltage, which requires an extremely small control electrode current and which can obtain an electron emission of high efficiency.

Here, it is needless to say that the present invention is not limited to the constitutions which have been explained in conjunction with the above-mentioned respective embodiments and various modifications are conceivable without departing from the technical concept of the present invention.

As has been explained heretofore, according to the present invention, in a flat panel image display element adopting an electrode structure in which, with the use of the cathode material such as carbon nanotubes or the like which can obtain the required electron beam intensity even in the relatively low electric field of several V/µm, the electron beams emitted due to the electric field between the anodes and the cathodes are interrupted in response to a voltage applied to the control electrodes, the flat panel image display element has a structure in which the control electrode lines which electrically connect a plurality of pixels are not included in the plane parallel to the phosphor screen panel including the cathodes and the control electrodes; and, hence, it is possible to provide the highly reliable flat panel display device having a matrix structure and which is capable of being driven with a low voltage.

What is claimed is:

1. A flat panel display device comprising:
    a first panel having a plurality of electron beam sources which are arranged in a matrix array, the electron beam sources being constituted of cathodes which emit electrons and control electrodes which are electrically insulated from the cathodes and control the quantity of electrons emitted from the cathodes, and a plurality of cathode lines and a plurality of control electrode lines which, in a state in which the cathodes and the control electrodes which constitute respective electron beam sources are respectively separated into a plurality of sets, electrically connect the cathodes and the control electrodes for the respective sets, the electron beam sources designated by respectively selecting some of the cathode lines and the control electrode lines serving to emit electrons; and
    a second panel having phosphors which emit light when impinged upon by electrons emitted from the electron beam sources corresponding to the arrangement of the electron beam sources;

wherein the cathodes and the control electrodes have surfaces which are arranged on the first panel so as to lie in a first flat cross-sectional plane which is parallel to a surface of the second panel having phosphors, and, further, the control electrode lines have surfaces which are arranged so as to lie in a second cross-sectional plane which differs from and is spaced from the first cross-sectional plane; and wherein on a straight line which connects an arbitrary point on a cathode and a point in a portion of a control electrode closest to the point on the cathode, an insulation material is present.

2. A flat panel display device according to claim 1, wherein the flat panel display device includes partition walls each of which has one end-side portion thereof in contact with the control electrode and another end-side portion thereof extending in a direction toward the second panel.

3. A flat panel display device according to claim 2, wherein portions of surfaces of the partition walls include conductive material, and the plurality of control electrodes are electrically connected to the conductive material.

4. A flat panel display device according to claim 2, wherein at least parts of said another end-side portion of the partition walls are in contact with the second panel.

5. A flat panel display device according to claim 1, wherein the cathodes include an electron emission material which directly emits electrons in a vacuum and the electron emission material contains carbon as a main component.

6. A flat panel display device according to claim 5, wherein the main component of the electron emission material is one selected from a group consisting of carbon nanotubes, micro carbon fibers, diamond, diamond-like carbon.

* * * * *